(12) United States Patent
Tanaka et al.

(10) Patent No.: US 10,554,090 B2
(45) Date of Patent: Feb. 4, 2020

(54) SHAFT SEAL DEVICE MOUNTED ROTATING ELECTRICAL MACHINE

(71) Applicant: MITSUBISHI ELECTRIC CORPORATION, Chiyoda-ku, Tokyo (JP)

(72) Inventors: Shohei Tanaka, Tokyo (JP); Yasuhiro Tohoda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/776,186

(22) PCT Filed: Mar. 8, 2016

(86) PCT No.: PCT/JP2016/057054
§ 371 (c)(1),
(2) Date: May 15, 2018

(87) PCT Pub. No.: WO2017/154084
PCT Pub. Date: Sep. 14, 2017

(65) Prior Publication Data
US 2019/0267863 A1    Aug. 29, 2019

(51) Int. Cl.
*H02K 5/124* (2006.01)
*B01D 19/00* (2006.01)
*F16N 39/00* (2006.01)

(52) U.S. Cl.
CPC ......... *H02K 5/124* (2013.01); *B01D 19/0036* (2013.01); *B01D 19/0063* (2013.01);
(Continued)

(58) Field of Classification Search
CPC ............ H02K 5/124; H02K 5/15; H02K 7/08; H02K 9/10; H02K 9/19; B01D 19/0036;
(Continued)

(56) References Cited

U.S. PATENT DOCUMENTS 2,307,755 A  *  1/1943  Beckwith  .............. H02K 5/124
                                                       310/55
2,454,979 A  *  11/1948  Snell  ...................... H02K 5/124
                                                       310/55
(Continued)

FOREIGN PATENT DOCUMENTS

EP       0543866 A1    6/1993
GB         802861 A  * 10/1958  .............. F16J 15/40
(Continued)

OTHER PUBLICATIONS

Extended European Search Report dated Nov. 23, 2018, issued by the European Patent Office in corresponding European Application No. 16893416.4. (9 pages).
(Continued)

*Primary Examiner* — Burton S Mullins
(74) *Attorney, Agent, or Firm* — Buchanan Ingersoll & Rooney PC

(57) ABSTRACT

A shaft seal device mounted rotating electrical machine includes; a rotating electrical machine which includes a rotating shaft equipped with a shaft seal device having an inlet portion and an outlet portion of seal oil, a main oil tank in which the seal oil supplied to the shaft seal device is stored, a seal oil cleanup tank which includes an inlet portion connected to an outlet portion of the main oil tank, and has an oil level regulating valve, a degassing pump which includes an inlet portion connected to an outlet portion of the seal oil cleanup tank, a pressure regulating valve which is disposed between the outlet portion of the seal oil cleanup tank and an outlet portion of the degassing pump, a differential pressure control valve which is disposed between the outlet portion of the degassing pump and the inlet portion of the shaft seal device.

5 Claims, 3 Drawing Sheets

(52) U.S. Cl.
CPC ........ *F16N 39/002* (2013.01); *F16N 2210/16* (2013.01); *F16N 2270/60* (2013.01)

(58) Field of Classification Search
CPC ... B01D 19/0063; F16N 39/00; F16N 39/002; F16N 39/02; F16N 39/06; F16N 2210/16; F16N 2270/60; F16C 33/60; F16C 31/00; F01D 11/04
See application file for complete search history.

(56) References Cited

U.S. PATENT DOCUMENTS

| | | | |
|---|---|---|---|
| 4,600,413 | A | 7/1986 | Sugden |
| 4,755,197 | A | 7/1988 | Benson et al. |
| 5,085,677 | A | 2/1992 | Ville et al. |
| 9,093,872 | B2 * | 7/2015 | Ajioka ............ H02K 5/124 |

FOREIGN PATENT DOCUMENTS

| JP | 56101006 | A | * | 8/1981 | ............ F01D 11/04 |
|---|---|---|---|---|---|
| JP | 58-141649 | A | | 8/1983 | |
| JP | 61293134 | A | * | 12/1986 | ............ H02K 9/24 |
| JP | S-62-500920 | A | | 4/1987 | |
| JP | S-63-502012 | A | | 8/1988 | |
| JP | H-04-222606 | A | | 8/1992 | |
| JP | 2004187373 | A | * | 7/2002 | ............ H02K 9/24 |
| JP | 2003-010605 | A | | 1/2003 | |
| JP | 2004-007876 | A | | 1/2004 | |
| JP | 2004007871 | A | * | 1/2004 | ............ H02K 5/124 |
| JP | 2008172939 | A | * | 7/2008 | ............ H02K 5/15 |
| JP | 2015006048 | A | | 1/2015 | |

OTHER PUBLICATIONS

International Search Report (PCT/ISA/210) dated Jun. 14, 2016, by the Japanese Patent Office as the International Searching Authority for International Application No. PCT/JP2016/057054.

Written Opinion (PCT/ISA/237) dated Jun. 14, 2016, by the Japanese Patent Office as the International Searching Authority for International Application No. PCT/JP2016/057054.

* cited by examiner

SHAFT SEAL DEVICE MOUNTED ROTATING ELECTRICAL MACHINE

FIELD OF THE INVENTION

The present invention relates to a rotating electrical machine, and more particularly relates to a shaft seal device mounted rotating electrical machine, which is provided with a shaft seal device for sealing a rotating shaft by the use of seal oil.

BACKGROUND OF THE INVENTION

In a rotating electrical machine, such as a turbine generator, a gas of hydrogen or the like is used as a cooling medium, for cooling the interior of a main body (for example, Patent Documents 1-5). The cooling media, like a hydrogen gas and others, is sealed on the inside of the rotating electrical machine by a shaft seal device which uses a sealing ring. As to that shaft seal device, oil is supplied to a rear chamber of the sealing ring through a feed oil pipe. The oil moves from that chamber towards the inner circumferential side of the sealing ring. According to the structure described above, the rear face temperature of the sealing ring is lowered in its portion close to an oil supply opening. Because the sealing ring cannot expand (nor deform), an oil film which covers the shaft becomes thinner in the portion close to the oil supply opening, so that temperatures of the oil film rise.

The rise in temperature of the oil film gives rise to cause damage to the sealing ring. In order to curb variations in the temperature, a sealing ring has been fabricated in advance in such a way that its inner diameter may become somewhat large in size, and therefore, the seal oil is consumed excessively there. The specifications of constituent components (a pump, a filter, and the like) of the shaft seal device are designed to cope with this excessive amount of oil. In order to curb the amount of oil which is required to seal the gas, the seal device is suitably designed to have a plurality of oil supply directions which head for the sealing ring. It is to be noted that, because air bubbles are contained in the seal oil, expelling any remaining air from the seal oil is required.

CITATION LIST

Patent Literature

Patent Document 1 JP 2004-7876, A
Patent Document 2 JP 2003-10605, A
Patent Document 3 JP 1104-222606, A
Patent Document 4 JP S63-502012, A
Patent Document 5 JP S62-500920, A

SUMMARY OF THE INVENTION

Technical Problem

The present invention relates to a shaft seal device mounted rotating electrical machine in which a hydrogen gas or the like is sealed, and more particularly, relates to a seal oil feeding device which supplies seal oil to the shaft seal device. In the shaft seal device mounted rotating electrical machine, found are many seal oil feeding devices which perform expelling of remaining air in the seal oil, by spraying the seal oil on the inside of a vacuum tank. These types of devices employ vacuum tanks and vacuum pumps, and therefore, a large installation space is required for the device. The shaft seal device mounted rotating electrical machine according to the present invention has been made in order to solve such subjects described above, and an object of the present invention aims at reducing the overall size of the machine, by promoting the efficiency in a treating part for degassing.

Solution to Problem

A shaft seal device mounted rotating electrical machine, according to the present invention includes; a rotating electrical machine which includes a rotating shaft equipped with a shaft seal device having an inlet portion and an outlet portion of seal oil, a main oil tank in which the seal oil supplied to the shaft seal device of the rotating electrical machine is stored, a seal oil cleanup tank which includes an inlet portion connected to an outlet portion of the main oil tank, and has an oil level regulating valve, a degassing pump which includes an inlet portion connected to an outlet portion of the seal oil cleanup tank, a pressure regulating valve which is disposed between the outlet portion of the seal oil cleanup tank and an outlet portion of the degassing pump, a differential pressure control valve which is disposed between the outlet portion of the degassing pump and the inlet portion of the shaft seal device.

Advantageous Effects of Invention

A shaft seal device mounted rotating electrical machine, according to the present invention includes; a rotating electrical machine which includes a rotating shaft equipped with a shaft seal device having an inlet portion and an outlet portion of seal oil, a main oil tank in which the seal oil supplied to the shaft seal device of the rotating electrical machine is stored, a seal oil cleanup tank which includes an inlet portion connected to an outlet portion of the main oil tank, and has an oil level regulating valve, a degassing pump which includes an inlet portion connected to an outlet portion of the seal oil cleanup tank, a pressure regulating valve which is disposed between the outlet portion of the seal oil cleanup tank and an outlet portion of the degassing pump, a differential pressure control valve which is disposed between the outlet portion of the degassing pump and the inlet portion of the shaft seal device. By having the constitution described above, the treating part for degassing is improved in its efficiency, so that vacuum tanks and vacuum pumps for degassing become unnecessary. In consequence, the reduction in overall size of the machine can be performed.

DESCRIPTION OF EMBODIMENTS

Figure 1:
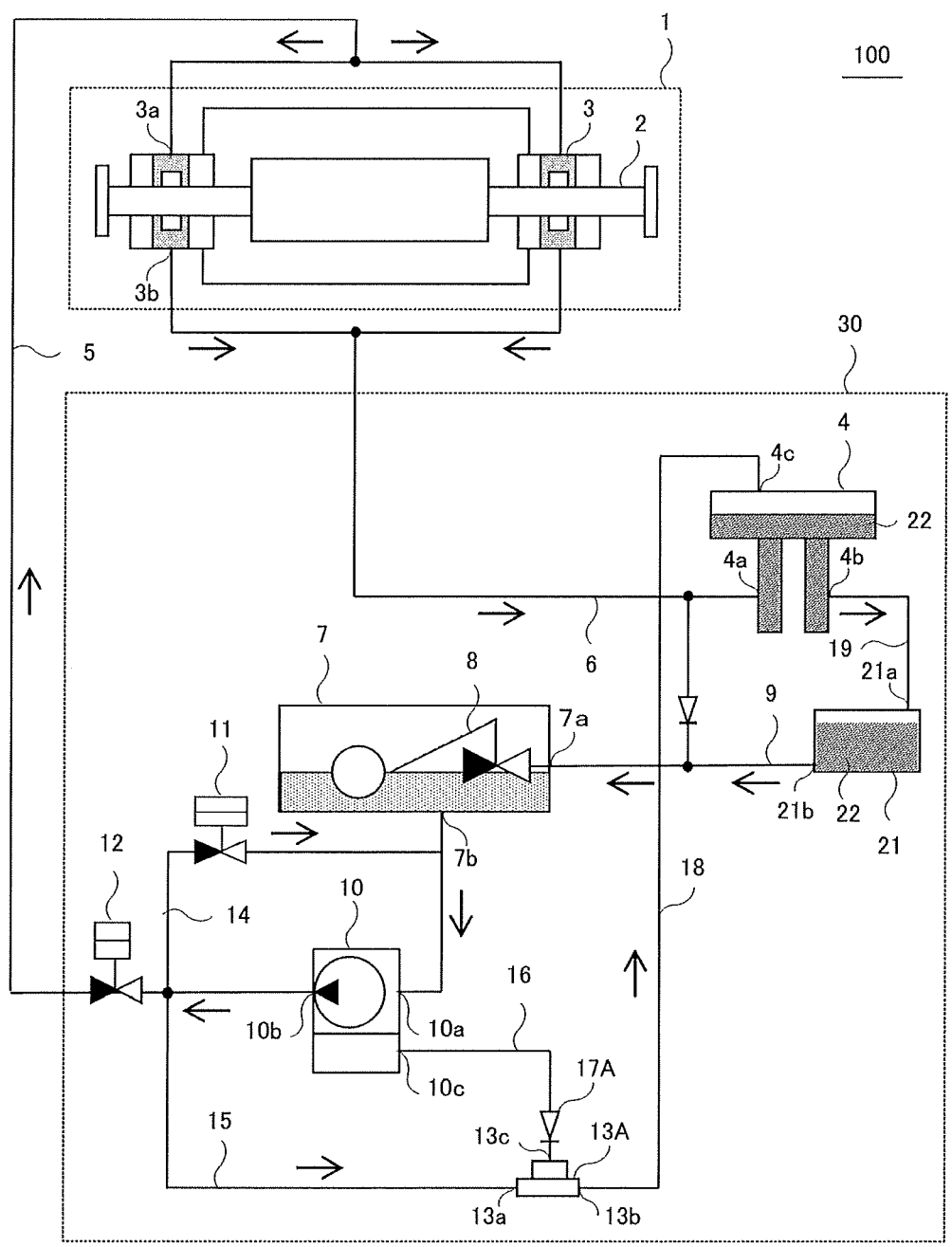
FIG. 1 is a diagram for illustrating an overall configuration of a shaft seal device mounted rotating electrical machine, in accordance with Embodiment 1 of the present invention.

Hereinafter, a shaft seal device mounted rotating electrical machine according to the embodiments of the present invention will be described with reference to drawings. Incidentally, the same reference numerals are given to those identical or similar to constitutional portions in respective drawings and the size and/or the scale size of the corresponding respective constitutional portions are respectively independent. For example, when the identical constitutional portions, which are not changed, are shown, the size and/or the scale size of the identical constitutional portions may be different among sectional views in which a part of the configuration is changed. Furthermore, although the configurations of the shaft seal device mounted rotating electrical machine are further actually provided with a plurality of members, for ease of explanation, only portions necessary for explanation will be described and other portions are omitted.

Embodiment 1

Hereinafter, explanation will be made for a shaft seal device mounted rotating electrical machine according to the embodiments of the present invention, based on the drawings. FIG. 1 is a diagram for illustrating an overall configuration of a shaft seal device mounted rotating electrical machine 100, in accordance with Embodiment 1 of the present invention. Here is shown a distribution diagram of a seal oil feeding device, on which an extra focus is put. The shaft seal device mounted rotating electrical machine 100 consists of a rotating electrical machine 1, a seal oil feeding device 30, and others. In the rotating electrical machine 1, hydrogen gas or the like is sealed as a medium for cooling the inside of a case. The cooling medium, like a hydrogen gas and others, is confined in the inside of the case by the shaft seal device 3, which uses seal oil, so that the cooling medium may not leak out. The shaft seal device 3, which is to be attached to the circumference of the rotating shaft 2, has an inlet portion 3a and an outlet portion 3b of the seal oil. Working also as lubricating oil of the rotating shaft 2, the seal oil is introduced from the inlet portion 3a of the shaft seal device 3, and is discharged from the outlet portion 3b of the shaft seal device 3.

Seal oil, which is supplied to the shaft seal device 3 of the rotating electrical machine 1, is stored in a main oil tank 21. A loop seal tank 4 includes a drain oil inlet portion 4a, a drain oil outlet portion 4b, and a degassing gas inlet portion 4c. This loop seal tank 4 is provided for the purpose of causing temporarily retaining of the seal oil 22 which is discharged from the shaft seal device 3. In the loop seal tank 4, the drain oil inlet portion 4a is connected with the outlet portion 3b of the shaft seal device 3, and the drain oil outlet portion 4b is connected with the inlet portion 21a of the main oil tank 21. Seal oil is supplied to the inlet portion 3a of the shaft seal device 3 through a seal oil feeding pipe 5. A seal oil feeding pipe 6 provides a connection between the outlet portion 3b of the shaft seal device 3 and the drain oil inlet portion 4a of the loop seal tank 4. A seal oil cleanup tank 7 has a function for cleaning up the oil quality of the seal oil, and is made of a vacuum chamber. An oil level regulating valve 8 is attached to the inside of the seal oil cleanup tank 7, in order to maintain the oil level of the seal oil cleanup tank 7 at a constant level.

A degassing pump 10 consists of a throttling device, separation blades, an inducer, a main bladed wheel, and a vacuum pump. In the degassing pump 10, when the lifting liquid of seal oil is made to flow in through the throttling device at the inlet portion 10a, gases which have been dissolved in the liquid will deposit by the effect of a reduced pressure, and will be led to the inducer in the form of a gas-liquid mixture. Rotation of the inducer pushes a liquid portion of the gas-liquid mixture against the outer periphery of the vacuum pump, and the gas-liquid mixture will be discharged from the outlet portion 10b. At the same time, a gaseous portion will be accumulated on the central part. On full exposure to a high vacuum, even the remaining gases in the liquid portion will begin to deposit in the form of air bubbles, at the boundary plane between the liquid and the gas. The vacuum pump draws out the gaseous matter powerfully through the separation blades, to carry out the degassing of the seal oil. The drawn out gaseous matter will be discharged from a degassing gas discharge portion 10c. Even if liquid remains in the gaseous portion, gas-liquid separation is carried out by the separation blade, and the liquid returns to an inlet portion of the inducer again.

The degassing pump 10 consists of an inlet portion 10a, an outlet portion 10b, and a degassing gas discharge portion 10c. The main oil tank 21 includes an inlet portion 21a and an outlet portion 21b. A pipe 9 provides a connection between the outlet portion 21b of the main oil tank 21 and the inlet portion 7a of the seal oil cleanup tank 7, and supplies seal oil (lubricating oil of the rotating shaft) from the main oil tank 21 to the seal oil cleanup tank 7 of the seal oil feeding device 30. In the degassing pump 10, the seal oil flows in from the outlet portion 7b of the seal oil cleanup tank 7. The degassing pump 10 can remove bubbles, air and the like which are contained in the seal oil, by employing a centrifugal separation type degassing pump for the degas processing.

A pressure regulating valve 11 is attached in order to maintain the outlet pressure of the degassing pump 10 at a constant level. A differential pressure control valve 12 carries out a control in such a way that the oil pressure in the shaft seal device 3 may become higher 1 by a certain value than the gas pressure on the inside of the rotating electrical machine. An ejector 13A (a first ejector) includes an air inlet port 13a, an air outlet port 13b, and an air filling opening 13c. The ejector 13A is provided for the purpose of discharging the air which is separated from the seal oil with the degassing pump 10. The air filling opening 13c is connected to the degassing gas discharge portion 10c of the degassing pump 10, and the ejector 13A is disposed between the outlet portion 10b of the degassing pump 10 and the degassing gas inlet portion 4c of the loop seal tank 4.

A pipe 14 is provided for the purpose of returning the seal oil, which is supplied to any point except the shaft seal device 3 and the ejector 13A, to an inlet (an inlet portion 10a) of the degassing pump 10. A pipe 15 supplies seal oil to the ejector 13A. A pipe 16 is provided for the purpose of discharging the air from the seal oil cleanup tank 7 and the degassing pump 10. A one way valve 17A (a first one way valve) is provided for the purpose of preventing reverse flow from occurring on the inside of the pipe 15. A pipe 18 is connected to the degassing gas inlet portion 4c, in order to return the air, the seal oil, and the moisture, which are discharged from the ejector 13A, to the loop seal tank 4. A pipe 19 is provided for the purpose of returning the seal oil from the drain oil outlet portion 4b of the loop seal tank 4 to the main oil tank 21.

Next, explanation will be made for the operation of the shaft seal device mounted rotating electrical machine 100. Hydrogen gas is contained in the interior of the rotating electrical machine 1, and the hydrogen gas is sealed with the seal oil which circulates through a seal oil circuit. The seal oil 22 is oil-fed from the outlet portion 21b of the main oil tank 21 to the seal oil cleanup tank 7 of the seal oil feeding device 30, and is pushed out with the degassing pump 10.

Furthermore, the seal oil, which is pushed out with the degassing pump 10, is adjusted by the differential pressure control valve 12, so that the seal oil may become higher in pressure by a certain value than the hydrogen gas which is contained on the inside of the rotating electrical machine 1. The seal oil, the pressure of which was adjusted, is delivered to the shaft seal device 3 through the seal oil feeding pipe 5, and is drained out to the loop seal tank 4.

Containing air and the like, the seal oil which is refilled to the seal oil cleanup tank 7 needs to be expelled of any remaining air. A large sized vacuum tank was needed and an ample installation space was required in a system, where the vacuum tank is maintained as a vacuum with a vacuum pump and the deaeration is performed by spraying the seal oil into the tank. On the other hand, in the shaft seal device mounted rotating electrical machine 100 according to the present application, the degassing pump 10 is employed, and therefore, squeeze pumping of the seal oil and separation of the air in the seal oil can be performed at the same time. Accordingly, a vacuum tank is eliminated in its necessity and a small sized seal oil cleanup tank 7 can be installed.

In order to discharge the air which is separated from the seal oil with the degassing pump 10, the degassing pump 10 is connected to the ejector 13A. Oil feeding to the ejector 13A is performed with the degassing pump 10. The seal oil, which is pushed out with the degassing pump 10, is oil-fed to the shaft seal device 3 (the differential pressure control valve 12), the inlet portion 10a (the pressure regulating valve 11) of the degassing pump, and the ejector 13A. The outlet pressure of the degassing pump 10 is maintained at a constant level by the pressure regulating valve 11, and therefore, a surplus in the seal oil is returned to the inlet of the degassing pump 10. Accordingly, the amount of oil which is supplied to the ejector 13A is maintained at a constant level, and the capability of degassing constantly can be always acquired in the rotating electrical machine.

As mentioned above, the shaft seal device mounted rotating electrical machine according to the present invention is capable of excluding a vacuum pump and a vacuum tank by applying a degassing pump 10, and the reduction in cost, the reduction in installation space and others can be performed. Therefore, the seal oil feeding device of the rotating electrical machine in accordance with the present embodiment, has a feature in that there is provided a degassing pump which carries out vacuum degassing to the seal oil, in order to maintain the concentration of the hydrogen gas on the inside of the machine, whereby the seal oil feeding device of the rotating electrical machine is concerned with a seal oil feeding device of the rotating electrical machine which is equipped with a seal oil supply circuit, where the seal oil supply circuit supplies seal oil to a shaft seal device of the rotating electrical machine shaft seal part in which hydrogen gas is sealed tightly.

In other words, a shaft seal device mounted rotating electrical machine, according to the present invention includes; a rotating electrical machine which includes a rotating shaft equipped with a shaft seal device having an inlet portion and an outlet portion of seal oil, a main oil tank in which the seal oil supplied to the shaft seal device of the rotating electrical machine is stored, a seal oil cleanup tank which includes an inlet portion connected to an outlet portion of the main oil tank, and has an oil level regulating valve, a degassing pump which includes an inlet portion connected to an outlet portion of the seal oil cleanup tank, a pressure regulating valve which is disposed between the outlet portion of the seal oil cleanup tank and an outlet portion of the degassing pump, a differential pressure control valve which is disposed between the outlet portion of the degassing pump and the inlet portion of the shaft seal device.

Embodiment 2

Figure 2:
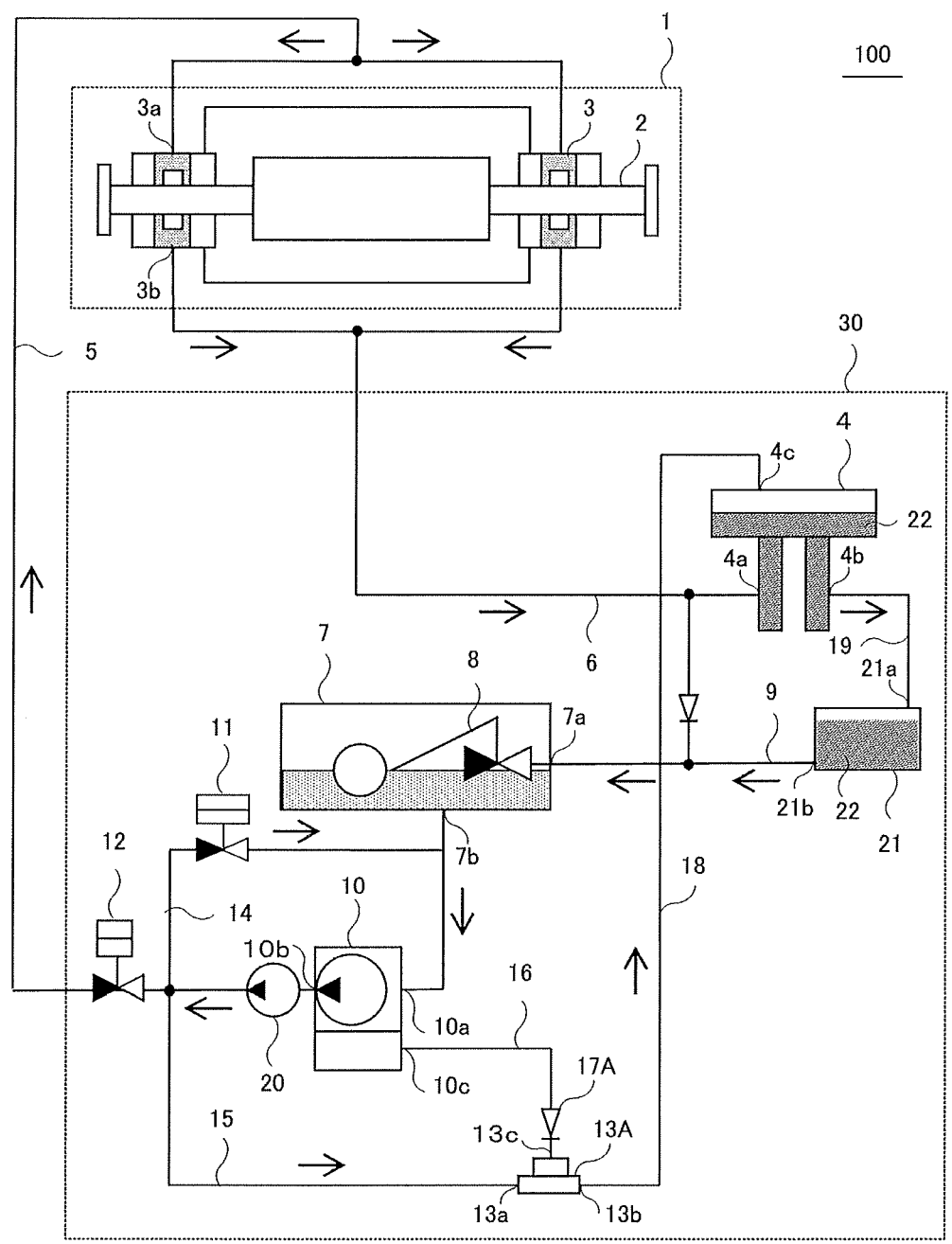
FIG. 2 is a diagram for illustrating an overall configuration of a shaft seal device mounted rotating electrical machine, in accordance with Embodiment 2 of the present invention.

FIG. 2 illustrates an overall configuration of the shaft seal device mounted rotating electrical machine in accordance with Embodiment 2 of the present invention. A booster pump 20 is disposed between the differential pressure control valve 12 and the outlet portion 10b of the degassing pump 10. That is to say, the booster pump 20 is installed in series at the outlet portion 10b of the degassing pump 10. By installing the booster pump 20 in series with the degassing pump 10, the rotating electrical machine is capable of increasing the pressure of the seal oil and enhancing the seal oil supply pressure, when an insufficient discharge pressure is obtained with the degassing pump 10 alone.

Therefore, the seal oil feeding device of the rotating electrical machine in accordance with the present embodiment has a feature in that there is provided a booster pump, in addition to the degassing pump which carries out vacuum degassing to the seal oil, in order to maintain the concentration of the hydrogen gas on the inside of the machine, whereby the seal oil feeding device of the rotating electrical machine is concerned with a seal oil feeding device of the rotating electrical machine which is equipped with a seal oil supply circuit, where the seal oil supply circuit supplies seal oil to a shaft seal device of the rotating electrical machine shaft seal part in which hydrogen gas is sealed tightly.

Embodiment 3

Figure 3:
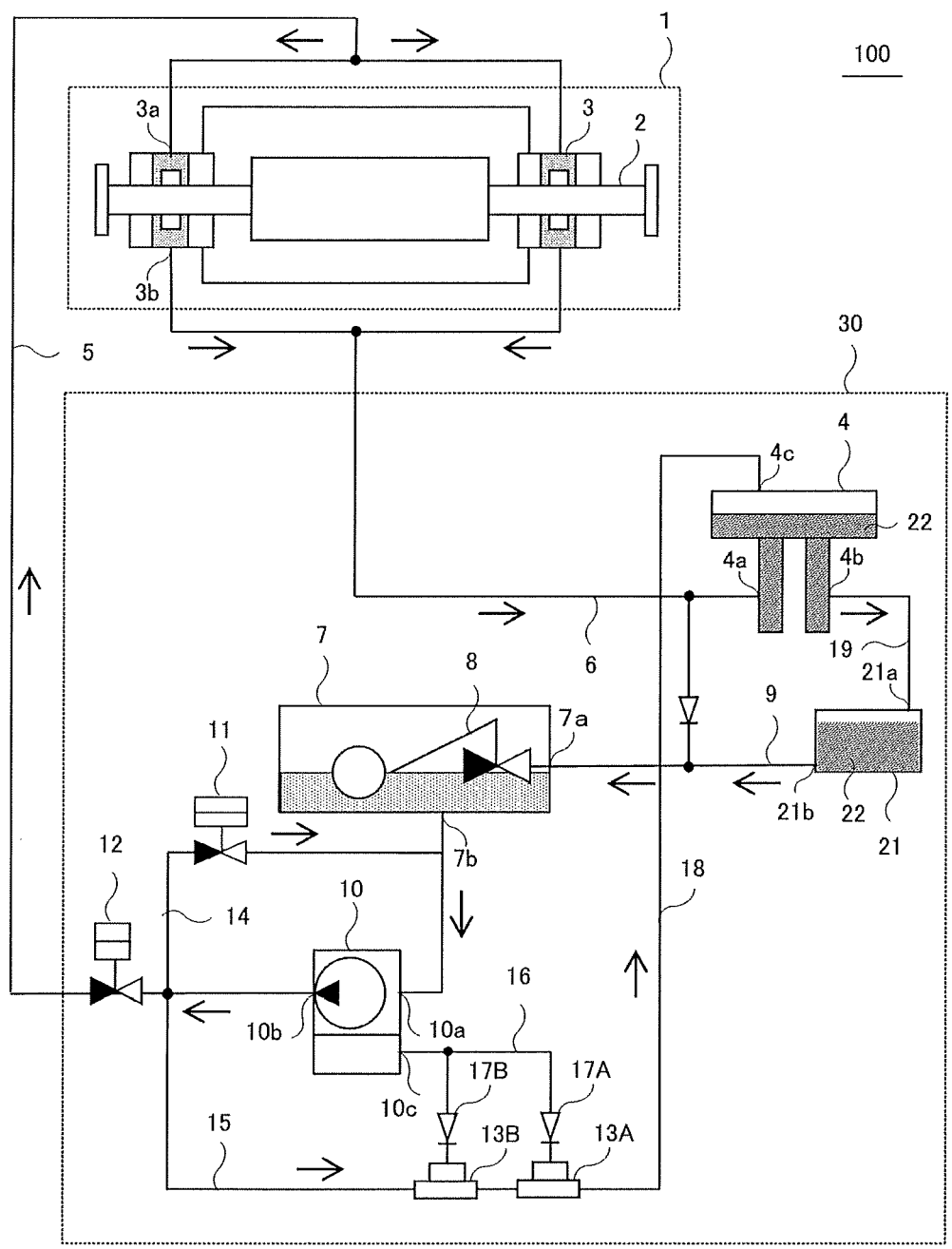
FIG. 3 is a diagram for illustrating an overall configuration of a shaft seal device mounted rotating electrical machine, in accordance with Embodiment 3 of the present invention.

FIG. 3 illustrates an overall configuration of the shaft seal device mounted rotating electrical machine in accordance with Embodiment 3 of the present invention. An ejector 13B (a second ejector) includes an air filling opening 13c which is connected to the degassing gas discharge portion 10c of the degassing pump 10, and is disposed between the outlet portion 10b of the degassing pump 10 and the ejector 13A (a first ejector). A one way valve 17B (a second one way valve) is provided for the purpose of preventing reverse flow from occurring on the inside of the pipe 15. The present embodiment deals with a case where two ejectors 13 are installed in series to the pipe 15. By connecting the air filling openings 13c of the ejectors in parallel, degassing capability can be enhanced, when an insufficient degassing capability is obtained by a single ejector alone.

Therefore, the seal oil feeding device of the rotating electrical machine in accordance with the present embodiment has a feature in that there is provided a degassing pump which carries out vacuum degassing to the seal oil, and also has a feature in that there is provided a plurality of ejectors, in order to maintain the concentration of the hydrogen gas on the inside of the machine, whereby the seal oil feeding device of the rotating electrical machine is concerned with a seal oil feeding device of the rotating electrical machine which is equipped with a seal oil supply circuit, where the seal oil supply circuit supplies seal oil to a shaft seal device of the rotating electrical machine shaft seal part in which hydrogen gas is sealed tightly.

Note that, in the present invention, each of the embodiments can be freely combined, appropriately modified and/or eliminated without departing from the scope of the invention.

EXPLANATION OF NUMERALS AND SYMBOLS

1 Rotating Electrical Machine, 2 Rotating Shaft, 3 Shaft Seal Device, 3a Inlet Portion, 3b Outlet Portion, 4 Loop Seal Tank, 4a Drain Oil Inlet Portion, 4b Drain Oil Outlet Portion, 4c Degassing Gas Inlet Portion, 5 Seal Oil Feeding Pipe, 6 Seal Oil Feeding Pipe, 7 Seal Oil Cleanup Tank, 7a Inlet Portion, 7b Outlet Portion, 8 Oil Level Regulating Valve, 9 Pipe, 10 Degassing Pump, 10a Inlet Portion, 10b Outlet Portion, 10c Degassing Gas Discharge Portion, 11 Pressure Regulating Valve, 12 Differential Pressure Control Valve, 13 Ejector, 13A Ejector, 13B Ejector, 13a Air Inlet Port, 13b Air Outlet Port, 13c Air Filling Opening, 14 Pipe, 15 Pipe, 16 Pipe, 17A One Way Valve, 17B One Way Valve, 18 Pipe, 19 Pipe, 20 Booster Pump, Main Oil Tank, 21a Inlet Portion, 21b Outlet Portion, 30 Seal Oil Feeding Device, 100 Shaft Seal Device Mounted Rotating Electrical Machine

What is claimed is:

1. A shaft seal device mounted rotating electrical machine, comprising;
    a rotating electrical machine which includes a rotating shaft equipped with a shaft seal device having an inlet port and an outlet port of seal oil,
    a main oil tank in which the seal oil supplied to the shaft seal device of the rotating electrical machine is stored,
    a seal oil cleanup tank which includes an inlet port connected to an outlet port of the main oil tank, and has an oil level regulating valve,
    a degassing pump which includes an inlet port connected to an outlet port of the seal oil cleanup tank,
    a pressure regulating valve which is disposed between the outlet port of the seal oil cleanup tank and an outlet port of the degassing pump,
    a differential pressure control valve which is disposed between the outlet port of the degassing pump and the inlet port of the shaft seal device.

2. The shaft seal device mounted rotating electrical machine as set forth in claim 1,
    the machine further comprising;
    a loop seal tank which includes a drain oil inlet port connected to the outlet port of the shaft seal device, and a drain oil outlet port connected to an inlet port of the main oil tank.

3. The shaft seal device mounted rotating electrical machine as set forth in claim 2,
    the machine further comprising;
    a first ejector which includes an air filling opening connected to the degassing gas discharge port of the degassing pump, and is disposed between the outlet port of the degassing pump and a degassing gas inlet port of the loop seal tank.

4. The shaft seal device mounted rotating electrical machine as set forth in claim 3,
    the machine further comprising;
    a booster pump which is disposed between the differential pressure control valve and the outlet port of the degassing pump.

5. The shaft seal device mounted rotating electrical machine as set forth in claim 3,
    the machine further comprising;
    a second ejector which includes an air filling opening connected to the degassing gas discharge port of the degassing pump, and is disposed between the outlet port of the degassing pump and the first ejector.

* * * * *